3/25/86

United States Patent [19]
Winter et al.

[11] Patent Number: 4,577,925
[45] Date of Patent: Mar. 25, 1986

[54] OPTICAL FIBER COMMUNICATION CABLES AND METHOD AND APPARATUS FOR ASSEMBLING SAME

[75] Inventors: Joseph Winter, New Haven; Michael J. Pryor, Woodbridge, both of Conn.

[73] Assignee: Olin Corporation, New Haven, Conn.

[21] Appl. No.: 497,533

[22] Filed: May 24, 1983

Related U.S. Application Data

[63] Continuation-in-part of Ser. No. 408,087, Aug. 13, 1982, abandoned.

[51] Int. Cl.⁴ .................................................. G02B 6/44
[52] U.S. Cl. ................................. 350/96.23; 228/148; 228/151
[58] Field of Search ............................ 350/96.23, 96.30; 228/146, 148, 151

[56] References Cited

U.S. PATENT DOCUMENTS

| 755,436 | 3/1904 | Bentel | 228/173.3 X |
| 2,475,566 | 7/1949 | Karmazin | 228/173.3 X |
| 4,166,670 | 9/1979 | Ramsay | 350/96.23 |
| 4,257,675 | 3/1981 | Nakagome et al. | 350/96.23 |

FOREIGN PATENT DOCUMENTS 2929968A 2/1981 Fed. Rep. of Germany .

Primary Examiner—John Lee
Assistant Examiner—Lester Rushin, III
Attorney, Agent, or Firm—Paul Weinstein; Howard M. Cohn; Barry L. Kelmachter

[57] ABSTRACT

An individually armored fiber optic core assembly having a diameter less than about 0.050" is provided as well as a process for making same. A fiber optic core comprising a fiber optic element and a surrounding protective layer is encased within a drawn metal sheath having a generally longitudinally extending seam. The ratio of the outside diameter of the fiber optic core to the inside diameter of the metal sheath is at least about 0.6:1.

34 Claims, 12 Drawing Figures

OPTICAL FIBER COMMUNICATION CABLES AND METHOD AND APPARATUS FOR ASSEMBLING SAME

CROSS REFERENCE TO RELATED APPLICATIONS

This application is a Continuation-In-Part of U.S. application Ser. No. 408,087, filed Aug. 13, 1982 (now abandoned).

This application is also related to U.S. Ser. No. 272,154, filed June 10, 1981, for Method And Apparatus For Assembling An Optical Fiber Communication Cable, now abandoned and refiled as a continuation-in-part application Ser. No. 497,546, filed May 24, 1983, for Method And Apparatus For Assembling An Optical Fiber Communication Cable; U.S. Ser. No. 413,846, filed Sept. 1, 1982, which is a Continuation-In-Part of U.S. Ser. No. 324,242, filed Nov. 23, 1981, for Method And Apparatus For Assembling An Optical Fiber Communication Cable; U.S. Ser. No. 395,443, filed July 6, 1982, for Method And Apparatus For Assembling A Compact Multi-Conductor Optical Fiber Communication Cable; U.S. Ser. No. 430,069, filed Sept. 30, 1982, for Process For Die Forming A Tubular Member At A Reduced Drawing Force; U.S. Ser. No. 461,736, filed Jan. 28, 1983, for Process And Apparatus For Fabricating Tubular Structures.

The invention disclosed herein relates to optical fiber communication cables and method and apparatus for assembling same. The cable produced by the instant invention has utility in both underground and undersea applications.

The advent of optical fibers for use in communication applications has permitted construction of relatively small diameter cables. Generally, an optical fiber communication cable is designed to provide all required electrical, optical, and physical functions within the smallest possible diameter. In addition, it is desirable that the cable be constructed to have a relatively long uninterrupted length and good flexibility characteristics. Furthermore, in undersea applications, the cable should be able to withstand such stresses as hydrostatic pressure, temperature and sea action.

An optical fiber communication cable generally consists of several layers of appropriate polyethylene, KEVLAR, or other similar materials encapsulating a strengthening means within which a dielectric layer is used to protect an inner tube or cable core. This inner tube or cable core is frequently made of materials which allow it to be used as a tubular conductor. This core also often contains an appropriate polyethylene or other long chain plastic gel to help position one or more glass optical fibers. Typical optical cable constructions are those shown and discussed in U.S. Pat. Nos. 3,955,878 to Nowak, 4,118,594 to Arnaud, 4,201,607 to Rautenberg et al., 4,212,097 to Portinari et al., 4,239,336 to Parfree et al., 4,232,935 to Rohner et al., 4,257,675 to Nakagome et al., 4,278,835 to Jackson, 4,279,470 to Portinari et al., and 4,288,144 to Nakai et al., in "Guidelines to the Design of Optical Cables" by Wilkins, presented at the Winter Annual Meeting, Dec. 2-7, 1979 of the American Society of Mechanical Engineers, in "An Electro-Optical Array Support Cable" by Wilkins, presented at the Winter Annual Meeting, Nov. 16-20, 1980 of the American Society of Mechanical Engineers, in "Recent Experience with Small, Undersea Optical Cables" by Wilkins, IEEE-EASCON, October 1979, Washington, D.C., in "How Small Can An Electro-Optical Transoceanic Cable Be?" by Wilkins, International Telemetry Society Conference, San Diego, Calif. Oct. 13-15, 1981 and in "Design and Performance of an Undersea, Single-Fiber, Multi-Repeater, Full Duplex, Electro-Optical Data Link", by Wilkins et al., International Telemetry Conference, San Diego, Calif. Oct. 13-15, 1981.

Various approaches for assembling these optical cables are known in the art. One approach places optical fibers within a split aluminum tube. A copper tube is made from copper tape and is formed over the aluminum tube so as to provide a hermetic seal. The copper tube may then be surrounded by a dielectric layer, a strength member layer, and a sheath. An alternative to this approach surrounds the aluminum tube by a copper tape layer, a dielectric layer, and a sheath. U.S. Pat. No. 4,239,336 to Parfree et al. is illustrative of these approaches.

In a second approach, a metal tube is manufactured by extrusion. A side of the tube is slit open as it emerges from the extrusion die. The opening is enlarged and one or more buffered optical fibers is inserted along with a void filling gel. The tube is then squeezed shut and the slit permanently closed as by welding. The tube is finally surrounded by a dielectric layer, a loadbearing section, and an outer jacket. Illustrative of this approach is "An Electro-Optical Array Support Cable" by Wilkins. A similar approach is shown in U.S. Pat. Nos. 4,212,097 and 4,279,470, both to Portinari et al.

Yet another approach known in the art rolls an electrical conductor tube from a flat-tape stock of copper material. Just before tube closure, the optical fibers and void filler or pressure buffer layer are inserted into the tube channel. The tube is then forced shut and permanently welded or soldered. Additional layers consisting of synthetic materials and containing high tensile strength materials are used to cover the conductor tube. Illustrative of this type of approach are U.S. Pat. Nos. 4,232,935 to Rohner et al. and 4,257,675 to Nakagome et al.

In British patent specification No. 1,172,272, published Nov. 26, 1969, there is disclosed an electro-optical coaxial cable wherein a clad optical fiber is encased in an inner metal coaxial conductor. The patent states that this is conveniently a copper conductor helically wound, braided, wrapped or manufactured by any conventional technique. The optical fiber of this cable is cladded with a polyethylene dielectric coating which acts as an optical absorbing layer and provides an outer diameter, for example, of 1.5 millimeters. It is clearly open to question whether clad optical fibers available today having diameters one third of that of the British patent fiber and clad could be effectively metal encased by the techniques described in the British patent. A consideration of the various patents and publications noted above indicates that cables employing multiple fibers require the use of special filler material for support such as a gel or other type of insert. Further, the considerably finer diameters of the clad optical fibers available at this time make them subject to damage or breakage in cable fabrication.

British Pat. No. 1,477,680 to Slaughter et al. discloses providing a continuous coating of a metal or metal alloy about an optical fiber. The coating is preferably formed by the method described in U.K. Pat. No. 1,038,534 to Haywood. In that process the coating is formed by drawing the fiber through a slot containing molten metal or metal alloy. A deficiency of the metal coated fiber of Slaughter et al. and the process for forming it of Haywood is that the metal or alloy is essentially cast about the fiber and, therefore, will in practice have a relatively low strength associated with a cast material. Further, the buffer for the fiber must be formed of a material which will not melt at the temperature of the molten metal or alloy. The provision of a cast coating versus a wrought metal sheath of this invention will result in the fibers of the British patents being less ruggedized and more susceptible to damage in use. Fiber optic elements presently employ plastic buffers which melt at relatively low temperatures as compared to the silica buffer utilized in the fiber optic elements of the British patents. Therefore, the process for forming the coating as described by Haywood would not be readily applicable to fiber optic elements used today employing plastic buffers.

In the British patent to Slaughter et al. and in British Pat. No. 1,479,427 to Dean et al. fiber optic cables are described which can employ a plurality of individually metal coated optical fiber elements. U.S. Pat. No. 4,166,670 to Ramsay is illustrative of fiber optic cable wherein fiber optic elements are supported within the interstices of a stranded non-optical strength member. The fiber optical elements employed in the cable of Ramsay are not individually armored.

U.S. Pat. No. 4,275,294 to Davidson discloses roll forming a metal strip about an optical fiber element to provide substantially intimate contact therebetween. U.K. Pat. No. 1,583,520 to Chapman and U.S. Pat. No. 4,372,792 to Dey et al. are illustrative of the use of dies for folding a metal tape into the shape of a tube about a fiber optic element or elements. U.S. Pat. No. 4,341,440 to Trezeguet et al. disclose an optical fiber cable having a protective metal casing about which an outer metal tube is formed by progressively skelping a metal tape and thin drawing it down onto the metal casing.

The tube forming approaches described in Davidson, Dey et al. and Slaughter et al. are believed to be particularly adapted for use with comparatively soft metal materials having relatively low strength. With such materials the folding approach described in these patents can provide a tube substantially closed as shown. However, when high strength sheathing is employed, a folding approach results in excessive spring back after tube forming which causes a substantial gap at the seam. Therefore, the approaches described in the aforenoted patents are not well suited for use with high strength metals or alloys.

In accordance with the present invention ultra fine individually metal armored optical fibers are provided. The metal armor serves to protect the optical fiber core from damage during fabrication into the desired end use cable. Further, the metal armor can be used as a conductor and/or strengthening member. The provision of individual metal armored fiber optic cores allows the construction of unique multi-fiber cable arrangements. In such arrangements each fiber optic core is individually metal armored. The metal armor can serve as conductors providing a plurality of individual conductors in the cable. This provides redundancy if needed or the opportunity for differing circuit arrangements for repeaters. Further, where a plurality of individually armored optical fibers are employed in a cable the armoring can act as a strength member as well.

The materials used for the armoring in accordance with this invention may be selected as desired. Where conductivity is important copper and copper alloys are preferred. However, if more limited conductivity is acceptable, then materials such as stainless steel can be employed, which by virtue of their high strength, can provide inherent strengthening members within the cable.

The armoring of the optical fiber core in accordance with this invention is preferably accomplished by forming a strip or tape of metal into a cylindrical sheath closely surrounding the fiber optic core through the use of one or more dies. The resultant metal sheath has a single longitudinally extending seam. The seam may be left unsealed if other means are provided for guaranteeing the hermeticity of the fiber optic core. Preferably, the seam is sealed by welding or soldering with soldering being most preferred.

In a preferred embodiment the metal sheath is in surrounding engagement with the fiber optic core, namely, the plastic protective covering about the optical fiber itself.

In yet another alternative the internal diameter of the metal sheath is selected to be slightly less than the diameter of the fiber optic core so that upon forming the metal sheath about the core a portion of the plastic from the core extrudes into the longitudinal seam to seal it and provide the desired hermeticity.

The material selected for the protective covering of the fiber optic core must be compatible with the temperature extremes that the core will be exposed to in fabricating about it the metal sheath.

The resultant armored fiber optic core can thereafter be handled relatively easily for further fabrication into fiber optic cable arrangements. The ultra fine fiber optic core and metal sheath assembly provided by this invention is uniquely adapted for application to multiple fiber cables wherein each fiber is individually armored. Where the fiber and sheath elements are to be utilized as conductors, they may be provided with a suitable insulative coating about the metal sheath. Alternatively, the fiber and sheath arrangements may be uninsulated but utilized in the cable in a separated fashion by extruding about the plural fiber optic assemblies an insulative material. Alternatively, the fibers may be ganged together and wrapped by a suitable tape or other kind of layer.

The ultra fine nature of the fibers and sheath assemblies in accordance with this invention permit the fibers to be inserted in the interstices between a plurality of cable strands. Therefore, in accordance with a preferred aspect of this invention it is possible to fabricate a cable comprising a plurality of cable strands which provide strength in the resultant cable and resistance to fish bites, etc., and to include in the interstices of those cable strands the sheathed fiber optic cores of this invention.

In accordance with the process of this invention the metal strip which is to form the sheath is preferably first preformed into a partial generally cylindrical shape and the preformed strip is then fed into a die arrangement wherein the fiber core is inserted simultaneously with the closure of the strip about the core.

Accordingly, it is an object of this invention to provide an improved metal sheathed fiber optic core assembly.

It is a further object of this invention to provide improved fiber optic cables including a plurality of such metal sheathed fiber optic cores.

It is a further object to provide a process and apparatus for making the above assemblies and cables.

These and other objects will become more apparent from the following description and drawings in which like elements have been given like reference numbers.

FIG. 1 is a cross section of a metal sheathed fiber optic core wherein the sheathing has not been sealed;

FIG. 2 comprises a cross section of a metal sheathed fiber optic core as in FIG. 1 wherein the longitudinal seam has been sealed by soldering;

FIG. 3 is a cross section of a metal sheathed fiber optic core herein the outer diameter of the core is less than the inner diameter of the sheath by a small amount;

FIG. 4 comprises a cross section of a metal sheathed fiber optic core as in FIG. 1 wherein the longitudinal seam has been sealed by extrusion of core material;

FIG. 5 comprises a cross section of a metal sheathed fiber optic core as in FIG. 2 further including an insulative coating;

FIG. 6 comprises a cross section of a fiber optic cable including a plurality of metal sheathed fiber optic cores;

FIG. 7 comprises a cross section of a fiber optic cable in accordance with an alternative embodiment;

FIG. 8 is a cross section of yet another embodiment of a multi-fiber optic cable;

FIG. 9 comprises a cross section of a multi-strand cable wherein a plurality of the strands but less than all the strands prise metal sheathed fiber optic core;

In accordance with the present invention it is proposed to eliminate the need for a filler material in a metal sheathed fiber optic core. This is accomplished by closely surrounding a fiber optic core composed of a glass fiber and a surrounding plastic layer with a metal sheath. Preferably, the metal sheath and fiber optic core are in intimate engagement. The metal sheath is formed from a wrought material so that as applied to the fiber optic core it has substantial strength in order to prevent injury to the core upon fabrication into a fiber optic cable. It is also desired in accordance with the present invention to provide such a metal sheathed fiber optic core wherein the overall diameter of the sheathed core is less than about 0.050" and preferably less than about 0.040". A comparison of this dimension to those described in the aforenoted British patent reveals that the metal sheathed fiber optic core of this invention is much smaller in diameter than the fiber optic core alone exampled in the British patent.

The ultra fine nature of the metal sheathed fiber optic core of this invention permits it to be assembled into fiber optic cable arrangements enploying a plurality of such metal sheathed fiber optic cores without sacrificing the reduction in diameter achievable with the use of fiber optics generally. The metal sheathing of the individual fiber optic cores allows them to be relatively easily fabricated into communication cables without damage to the fiber optic elements.

Figure 1:
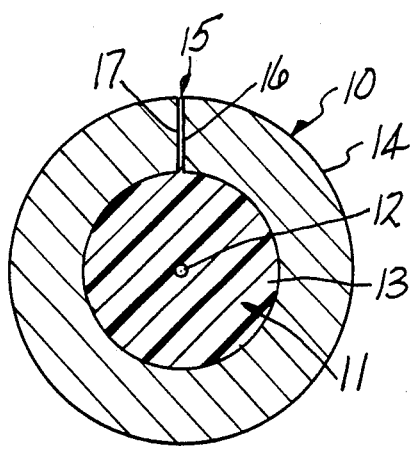

Referring now to FIG. 1, there is shown a cross section of a metal sheathed fiber optic core assembly 10 in accordance with one embodiment of the invention. The assembly is comprised of a fiber optic core 11 composed of a fiber optic element 12 surrounded by a plastic protective layer or coating 13. Closely surrounding the fiber optic core 11 is a metal sheath 14. The metal sheath 14 includes a longitudinally extending seam 15. In the embodiment shown in FIG. 1 the seam is comprised of opposed strip edges 16 and 17 whidh preferably substantially abut one another due to the elastic nature of the metal sheath 14. In the embodiment of FIG. 1 no attempt has been made to seal the seam 15 for purposes of hermeticity, etc. In accordance with this arrangement the metal sheath is principally for providing an armoring layer to prevent damage to the fiber optic core 11. Of course, since the metals which would be used for the sheath would be electrically conductive the armoring layer 14 could also comprise an electrical conductor in the resultant cable. In the embodiment of FIG. 1 the fiber optic core 11 has substantially about the same outside diameter as the inside diameter of the metal sheath 14. Preferably, as shown, there is a generally intimate engagement between the outer surface of the fiber optic core 11 and the metal sheath 14 in accordance with this embodiment.

Figure 2:
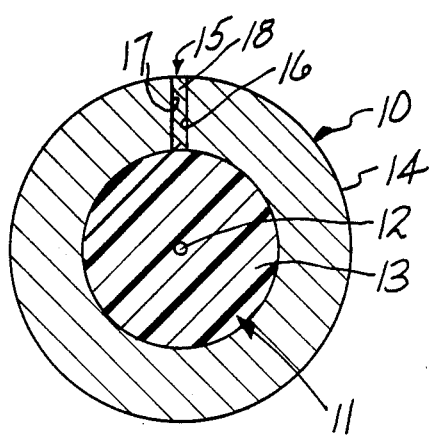

Referring now to FIG. 2, the core assembly 10 of FIG. 1 is shown with a sealed seam 15. In this embodiment the seal comprises a solder seal 18. The width of the seam 15 has been exaggerated in this figure in order to show the solder seal 18. However, in practice the edges 16 and 17 of the metal sheath 14 would substantially abut as in FIG. 1. The purpose of the solder seal 18 is to provide hermeticity with respect to the fiber optic core 11 and also to prevent the opening of the metal sheath 14 during fabrication or use of the resultant cable. As in the previous embodiment, the fiber optic core 11 has its outer surface substantially engaged to the inner surface of the metal sheath 14.

Figure 3:
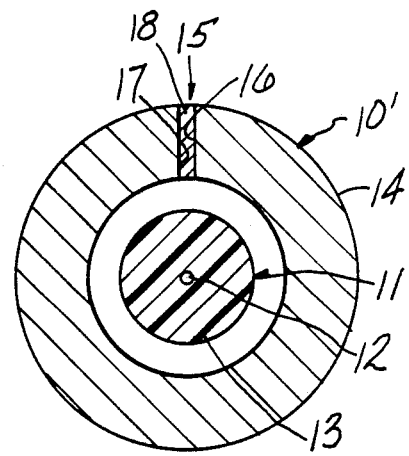

Referring now to FIG. 3, another alternative embodiment of a metal sheathed fiber optic core 10' assembly is shown. In this embodiment the metal sheath 14 is constructed in essentially the same fashion as the metal sheath of the previous embodiment and includes a solder seal 18. What differentiates this embodinent from the previously discussed embodiments is that the fiber optic core 11 has an outside diameter which is less than the inside diameter of the metal sheath 14. It is important, however, in order to prevent kinking or damage to the fiber optic core 11 that the ratio of the outside diameter of the fiber optic core 11 to the inside diameter of the metal sheath 14 be at least about 0.6:1 and, preferably, be at least about 0.7:1. Such an arrangement will allow for a generally loose fit between the fiber optic core 11 and the metal sheath 14 but not so loose that the core 11 could flop around so as to be damaged or kinked in use.

Figure 4:
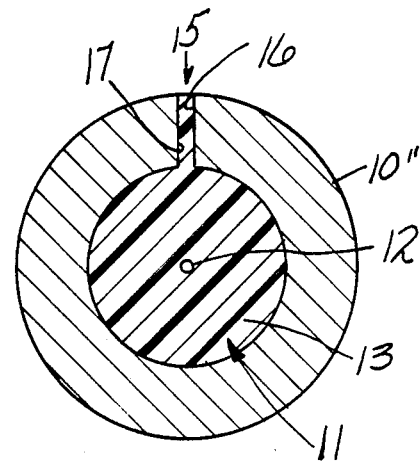

Referring now to FIG. 4, a further embodiment of a metal sheathed optical core assembly 10" is shown. In this core assembly 10" the internal diameter of the metal sheath 14 has been selected so that it is slightly less than the outside diameter o. the fiber optic core 11. Therefore, when the sheath 4 is formed about the core 11, a portion of the thermoplastic layer 13 is extruded into the seam 15 to provide a hermetic seal for the sheath 14. This extrusion can be accomplished depending on the material which makes up the layer 13 at the temperature at which the sheath is formed about the core 11. If needed, additional heat for extrusion could be provided by heating the sheath forming apparatus. In using this approach, the fiber optic core 11 would be indirectly heated and should assist in melting the thermoplastic layer 13. Alternatively, extrusion of the layer 13 into the seam 15 could be accomplished by directly heating the fiber optic core 11 to melt the thermoplastic layer 13 surrounding the fiber optic core. In performing this approach, the fiber is preferably heated to a temperature in the range of about 200° F. to about 400° F. and most preferably to a temperature in the range of about 250° F. to about 350° F. Any suitable conventional heating device known in the art may be used to directly heat the fiber optic core 11. This approach would be particularly useful in extruding thermoplastic layers comprising either nylon or a polyester elastomer sold under the trademark HYTREL by the Dupont Corporation. An advantage of this approach is that it would insure substantially complete and intimate engagement between the outer surface of the fiber optic core 11 and the inner surface of the sheath 14. In appropriate circumstances it might also provide a degree of bonding between the respective thermoplastic layer 13 and sheath 14. The approach of this embodiment of the invention, of course, could only be utilized where the thermoplastic layer material 13 can be extruded without damage or loss of properties of the fiber optic core 11.

The metal sheathed fiber optic core assemblies 10, 10' and 10" can be used in any resultant communication cable as an electrical conductor. For certain applications, therefore, it may be desirable to provide an insulative coating 19 as in FIG. 5 about the metal sheathed fiber optic core assembly 10, 10' or 10" so that they may be ganged or stranded together to provide a plurality of metal sheathed assemblies in the cable which are electrically isolated one from the other. The electrical insulation layer 19 may comprise any well-known insulating material including plastic or varnishes as are well known. The thickness of the insulative layer depends on the load to be carried by the sheath.

The metal sheathed fiber optic core assemblies 10, 10' and 10" can be fabricated in accordance with this invention in any desired length. For example, lengths of at least about 10 to 20 kilometers should be fabricable in accordance with this invention and very likely substantially greater lengths, if desired.

The metal sheath 14 is preferably formed of wrought material which is in a partially work hardened state. The metal sheath 14 is further work hardened by virtue of the means by which it is applied to the fiber optic core 11. The material comprising the metal sheath 14 should possess desired conductivity and strength. The material should possess a high conductivity since the sheath 14 preferably acts as a conductor in the final communication cable. For example, in a communication cable the sheath 14 may be used to carry current between repeaters, not shown, which may be spaced apart as desired. The sheath 14 preferably possesses significant yield strength and a relatively high yield strain so that the sheath 14 is in a substantially elastic state for any degree of cable bending which will be encountered. By having the sheath maintained in a substantially elastic state and substantially never in a plastic state the risk of breaking of the glass fiber or fibers due to placing them in tension is minimized.

The material used to produce the sheath 14 should also be capable of sustaining coiling forces during fabrication and installation. The sheath material 14 preferably has a conductivity in the range of about 25 to about 102% IACS and a yield strength of at least about 30 ksi and, preferably, at least about 50 ksi. The thickness to diameter ratio of the sheath preferably is from about 0.02:1 to about 0.5:1 and most preferably from about 0.1:1 to about 0.3:1. Preferably the metal sheath 14 has a yield strain of less than about 1%, and most preferably about 0.3% to about 0.95%.

A number of metals and alloys possess the required combinations of strength conductivity such as copper and its alloys and steel, e.g. stainless steel and may, therefore, be utilized. In a preferred embodiment the material forming the sheath 14 comprises a high copper alloy containing zirconium, designated as C.D.A. Copper Alloy 15100. C.D.A. Copper Alloy 15100 has a conductivity of about 95% IACS, a yield strength of about 62 ksi, and a yield strain of about 0.36%

The seam of the metal sheathing 14 in accordance with this invention should extend in a generally linear direction longitudinally of the assembly. The method and apparatus for forming the assemblies 10, 10' and 10" will be described in detail later.

Figure 6:
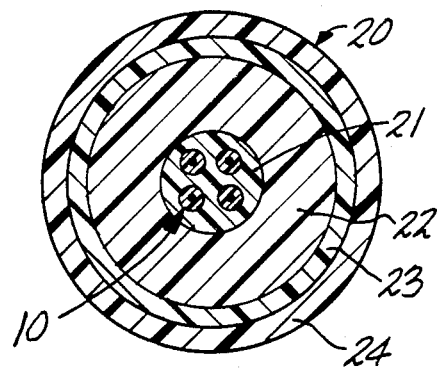
Figure 7:
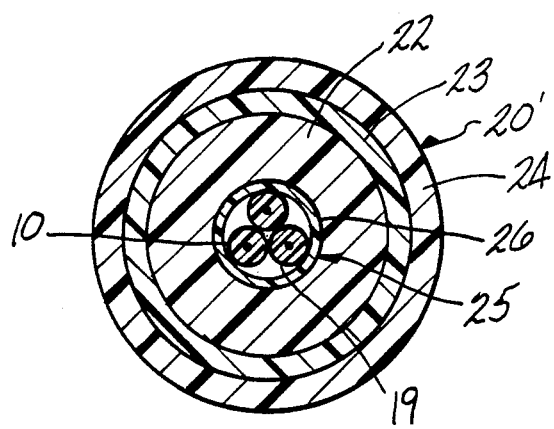

Referring now to FIGS. 6 and 7, communication cables 20 or 20' employing the metal sheathed fiber optic core assenblies 10, 10' or 10" in accordance with this invention are illustrated. Each of the communication cables 20 or 20' includes a plurality of metal sheathed fiber optic core assemblies 10. Alternatively, if desired, the core assemblies could comprise 10' or 10" as in FIGS. 3 and 4. Further, as desired, the core assemblies 10, 10' or 10" could include an insulative coating 19 although this will probably depend on whether or not the metal sheathing of each assembly 10, 10' or 10" is to be used as an individual conductor.

In the embodiment of FIG. 6 a suitable plastic core 21 such as polyethylene has been extruded about four fiber optic assemblies 10 which are thereby separated and insulated from one another. A further dielectric layer 22 has also been extruded about the plastic core 21 in a conventional manner. The dielectric layer 22 preferably comprises a high density polyethylene although any suitable material may be used. The dielectric layer preferably takes no part in system telemetry and acts only as an insulator. However, if desired, it may be designed to take part in the system telemetry. Further, core 21 and layer 22 could be combined as a single element, if desired.

Surrounding the dielectric layer 22 is a load-bearing layer 23. The loadbearing layer 23 serves as a tensile element in this cable although depending on the material employed for the metal sheaths 14 of the core assemblies 10 some portion as desired of the total load may be carried by the sheaths 14. The loadbearing layer 23 also acts as an abrasion resistant layer which completely covers and protects the cable core 21. Any suitable material may be used for this layer. However, preferably, it comprises a contrahelix of a polyimide such as KEVLAR filaments contained in a matrix of thermosetting epoxy.

Finally, an outer covering 24 is provided about the loadbearing layer 23. The outer covering 24 serves as a barrier to water intrusion and defocuses external cutting or braiding forces. The outer covering 24 comprises any suitable material such as an elastomeric layer which is extruded over the loadbearing layer 23. In a preferred embodiment the layer 24 comprises black polyurethane.

The cable 20' of FIG. 7 is essentially similar to that of FIG. 6 except that the core 25 is comprised of three ganged or stranded metal sheathed core assemblies 10 wrapped by a layer of MYLAR tape 26. In this embodiment the core assemblies 10 are arranged in engagement with each other and, therefore, the presence of an insulating layer 19 would be required if the sheaths 14 are to act as individually isolated conductors within the cable 20'.

A consideration of the communication cable embodiments 20 and 20' of FIGS. 6 and 7 clearly illustrate the unique ability to employ multiple optical fibers while also providing multiple electrical conductors isolated one from the other for use as power carrying elements. For example, having multiple isolated conductors would eliminate the necessity of using a seawater return for an undersea cable. The provision of multiple independent conductors also could be used to provide a redundancy so that in the event one sheathed core assembly 10 were damaged by a fish bite which broke the continuity of the sheath 14 the remaining assemblies 10 could still be utilized. Further, the provision of multiple conductors would provide additional control circuit possibilities.

Finally, the provision of multiple fiber optic elements each with its own sheath 14 should enable the sheaths 14 in combination to carry a substantial portion of the tensile load of the cable. This is particularly the case where the material forming the sheath is selected for high strength. For example, one could utilize a stainless steel such as A.I.S.I. type 304 stainless steel for the sheath. While this would not have as high conductivity as C.D.A. Copper Alloy 15100 it would provide superior strength and, therefore, the sheaths 14 of the assemblies 10 in combination could carry a substantial portion of the tensile load of the resultant communication cable and possibly eliminate the need for loadbearing layer 23.

Figure 8:
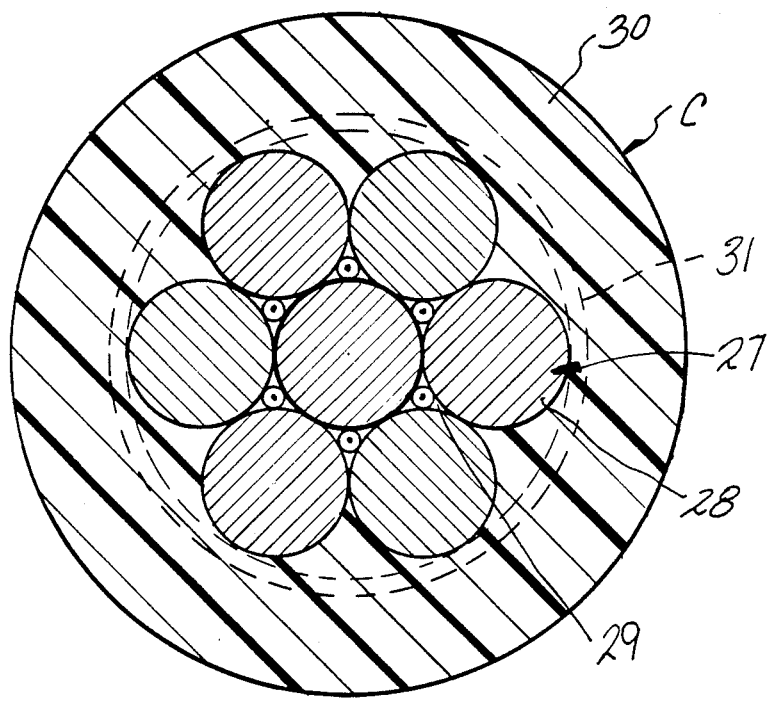

Referring now to FIG. 8, there is shown yet another alternative communication cable embodiment C. This cable C makes use of the ultra fine nature of the core assemblies 10, 10' and 10" of this invention. In this cable C a seven strand cable is provided as the core 27. Each of the strands 28 can comprise a plurality of strands, if desired. The core 27 provides substantial strength for the resultant cable C. It is a unique aspect of this invention that the metal sheathed core assembly 10 is sufficiently small in diameter to fit within the internal interstices 29 defined between the respective strands 28 of the core 27. In the cable of FIG. 8 six core assemblies 10 are shown in the respective six internal interstices 29.

In accordance with one embodiment a protective plastic sheath 30 formed of extruded polyurethane or any other desired plastic material is thereafter formed about the seven strand core 27. If desired, the core 27 could first be wrapped by a plastic tape 31 such as MYLAR as shown in phantom in which case the extruded layer 30 would begin at the outer surface of the tape 31. The strands 28 may be metal or a plastic such as KEVLAR as desired. The strands 28 which make up the core 27 provide substantial protection from damage to the fiber optic core 11. In particular, protection from fish bites and other similar problems are provided. The use of a stranded or ganged core 27 provides substantial load-bearing capacity for this type of cable C making it suited for above the ground application where it could be hung in catenary fashion or for use as a tow cable.

Figure 9:
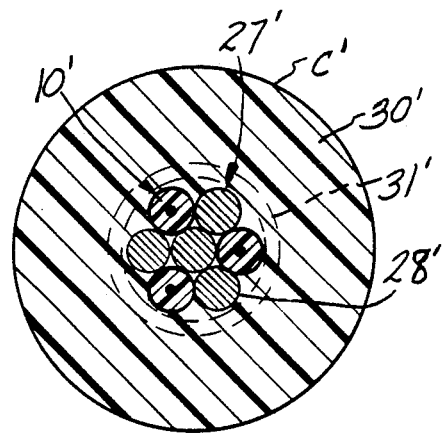

Referring now to FIG. 9, there is shown yet another alternative communication cable embodiment C' having uses analogous to that of the previous embodiment. This cable C' comprises a seven strand cable core 27' wherein a plurality of the strands but less than all of them comprise core assemblies 10, 10' or 10" of this invention. The retaining strands 28 can each comprise a plurality of strands as desired and may be formed of metal or plastic as in the previous embodiment. Preferably, the cable core 27' includes a plurality of plastic or metal strands 28 and a plurality of sheathed core assemblies 10; etc. In this embodiment, the outside diameter of the sheathed core assemblies 10, etc., of this invention should be substantially the same as the outside diameter of the metal or plastic strands 28. It is a unique aspect of this invention that the metal sheathed core assembly 10 should be adapted to be stranded into a cable core 27' without damage to the fiber optic core 11. The core 27' can include an extruded layer 30' or a combination of a tape wrap 31' and extruded layer 30' as desired in reference to the previous embodiment or any other desired arrangement.

Figure 10:
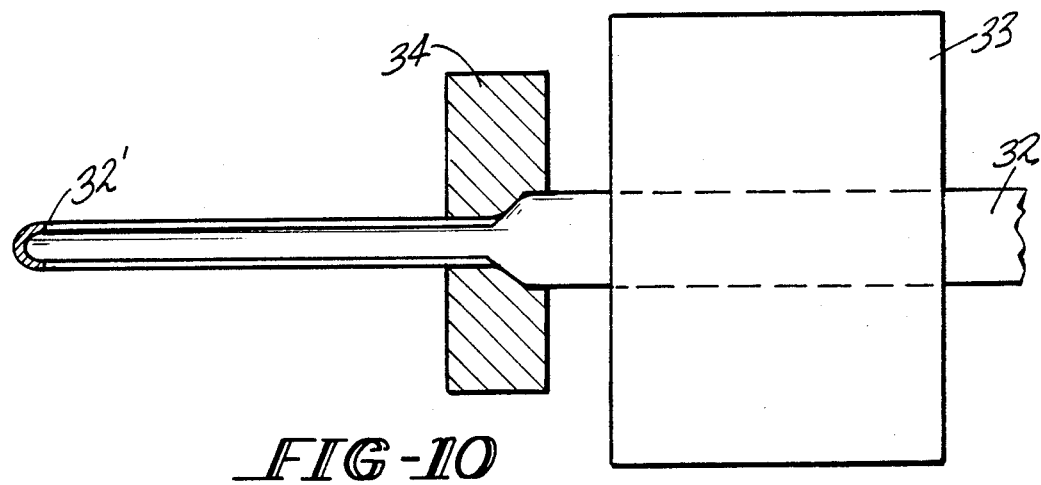
FIG. 10 is a schematic representation of an apparatus for cleaning and preforming a metal sheathing strip.

Referring now to FIG. 10, there is shown by way of example an apparatus for preforming the metal strip 32 for use in providing the sheathing layer 14. The metal strip 32 is preferably in a wrought and partially work hardened form and has a hardness or strength sufficient to enable it to be formed by drawing through a die and selected such that the final strength of the sheathing will be high enough to prevent damage to the internal fiber optic core 11. The strip 32 would be received normally in the form of a long coil. The as received strip 32 is fed to a cleaning station 33 comprising a weak caustic solution, such as a soapy solution, which is adapted to remove contaminants from the strip. The strip 32 is then drawn through a metal die 34 which forms it into a partial cylindrical "C" shape as shown. The strip 32' thus preformed may be recoiled for further processing.

Figure 11:
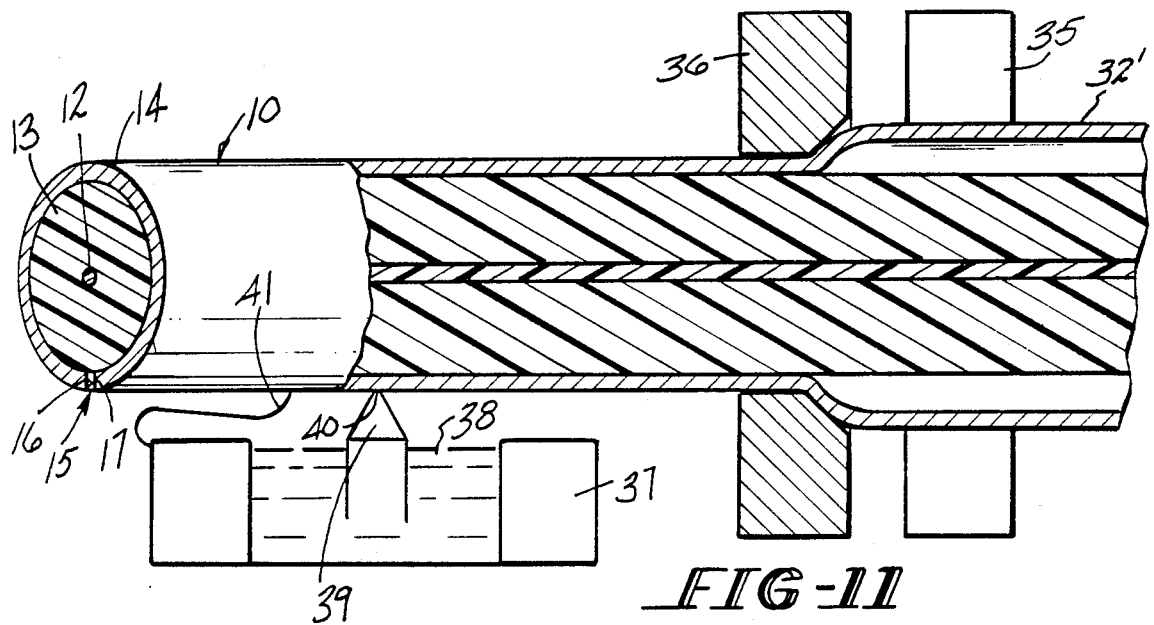
FIG. 11 is a schematic representation in partial cross section of an apparatus for forming the preformed strip into a netal sheath about the fiber optic core.

Referring now to FIG. 11, the preformed strip 32' received from the apparatus of FIG. 10 is fed to a fluxing station 35 wherein flux is applied to the edges 16 and 17 of the strip 32'. Thereafter, the strip is fed to a second die 36 which draws the preformed strip 32' into the fully cylindrical sheath 14 as shown in cross section. Thereafter, the assembly 10 is fed to a soldering station 37, if desired, in order to seal the seam 15 to provide hermeticity. While any suitable solder may be used to seal the seam 15, it has been found that when a fabrication technique for forming one or more of the additional layers 22, 23 or 24 about the assembly 10 uses high temperatures it is desirable to use a high temperature solder such as a silver solder. While the mechanism for sealing the seam 15 has been described in terms of a particular soldering operation, any suitable soldering, brazing or welding technique could be used.

A supply of solder 38 is provided in a sump or bath arrangement. The solder is fed in a conventional manner such as by a pump, not shown, to a soldering head 39 having an orifice 40. The solder is preferably fed through the soldering head 39 and orifice 40 at a pressure sufficient to create a spout of solder. The metal sheath 14 and the seam 15 are passed over the spout of solder. The movement of the sheath over the spout of solder and the surface tension drive the solder into the seam 15 by capillary action. After the solder solidifies the sheath 14 is hermetically sealed. Any suitable solder including silver solders, high temperature solders, low temperature solders such as lead-tin solder, lead-antimony solder, tin-antimony solder, etc., may be used to seal the seam 15 of the sheath 14. After passing over the soldering head 39 the sheath 14 passes over a wiping device 41 for removing any excess solder. Wiping device 41 may comprise a spring wipe or any other suitable wiping mechanism.

The apparatus of FIG. 11 is particularly adapted for forming fiber optic metal sheathed cable core assemblies 10 and 10' as illustrated in FIGS. 2 and 3. To form the assembly 10" as illustrated in FIG. 4 the fluxing station 35 would be changed to a station for heating the strip 32' and the soldering station 37 would be eliminated. In this embodiment the die 36 causes the layer 13 of the fiber optic core 11 to extrude into the seam 15.

Figure 12:
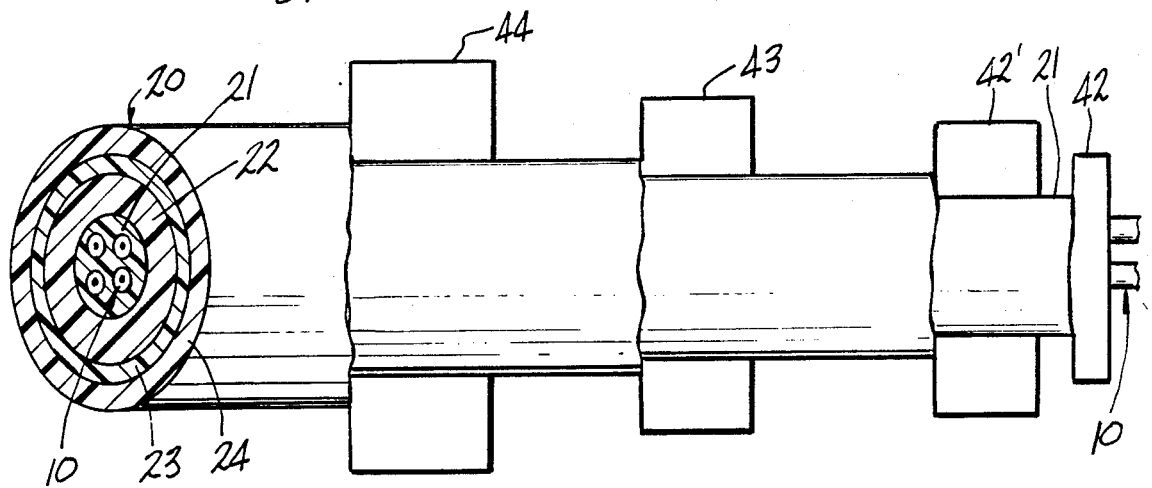
FIG. 12 is a schematic representation of an apparatus for forming additional layers of a fiber optic cable.

Following the formation of the metal sheathed fiber optic core assembly 10, 10' or 10" utilizing the apparatuses of FIGS. 10 and 11 as described above, the core 21 and the additional layers 22, 23 and 24 as described may be formed by an apparatus as shown in FIG. 12. The dielectric core 21 and layer 22 are provided by extrusion arrangements 42 and 42' in a conventional manner. For the embodiment of FIG. 7 the extruder 42 would be changed to a tape wrapping mechanism. The fabrication of the loadbearing layer 23 may be done in a known manner by any suitable fabricating device 43, for example, an annulus utilizing a die arrangement. Finally, the outer covering may be extruded by any conventional apparatus 44 employing a standard extrusion mechanism. Additional layers may be provided if desired by braiding, taping, winding or extruding as desired in accordance with conventional practices for forming communication cables.

The communication cables in accordance with this invention can be utilized for undersea, underground, above ground applications as desired. They may be used for telephonic type communications, sensory communications, data communications, etc., or any other desired purpose for which fiber optic communication cables are employed.

The apparatuses described by reference to FIGS. 10, 11 and 12 can be arranged if desired as in-line continuous operation through the use of intermediate take-up and payoff equipment which can accommodate any speed differences through the respective apparatuses. For such a continuous line arrangement for providing multiple sheath optical fiber core assemblies there would be required a plurality of in-line stations in accordance with FIGS. 10 and 11.

Where the sheathing 14 is soldered as in FIG. 11 the core assembly 10 should be moved past the soldering head 39 as fast as possible while maintaining a sound solder seal. The reason for this is to minimize the temperature effects of the soldering operation on the fiber optic core 11. Accordingly, a cooling station may be provided downstream of the soldering station 37 in order to quickly remove any excess heat imparted to the assembly 10.

The use of a die to form a tube from strip material is well known in the art. However, the application of such a technique for forming tubing having a diameter less than about 0.05" is believed to be unique.

While it is not preferred, if desired, the core assembly 10, 10' or 10" can be passed through a sizing die to insure exact dimensions.

Preferably, the fiber optic component 12 of the fiber optic core 11 comprises a photoconductor glass rod. However, any suitable optical fiber as are known in the art may be used in accordance with this invention.

The strip 32 which is used to form the sheath 14 preferably has an initial width slightly greater than the outside circumference of the sheath. Preferably, the initial width is about 5% to about 20% and most preferably from about 8% to about 17% greater than the sheath 14 outside circumference. By starting with such an initial strip width the seam 15 created during sheath formation will be put into significant compression, thereby the edges 16 and 17 will be substantially abutted even if springback occurs following die formation. Alternatively, if desired, the edges 16 and 17 of the strip 32 may be shaped in any suitable manner so that a mechanical interlock joint is formed along the seam 15.

Alternatively, in order to reduce the drawing force it has been found to be quite advantageous to form the sheath 14 from a metal strip 32 having a transverse cross-sectional area which exceeds the desired transverse tube cross-sectional area by about 5% to about 20% and preferably by about 8% to about 17%. Inherently with the tube-forming techniques used herein the extra volume of metal provided by the excess cross-sectional area or strip width shows up essentially as longitudinal extension of the resulting sheath 14. It has been found that using the tube-forming techniques described herein there is no significant change in wall thickness. The wall thickness of the resultant tube is substantially the same as the thickness of the starting strip 32. The tube-forming techniques described herein are, therefore, similar in some respects to "tube sinking". The total length of sheath 14 produced by the tube-forming techniques of this invention will be greater than the total length of the starting strip 32 due to the aforenoted longitudinal extension of the sheath 14. The amount of the sheath or tube extension corresponds substantially to the aforenoted percentage differentials in strip cross-sectional area versus tube cross-sectional area.

This extra volume of metal also inherently assists in the formation of a sheath having a relatively tight seam 15 without a notch or well at the outer periphery of the seam. Further, the edges 16 and 17 of the metal sheath 14 are inherently deformed by the tube-forming techniques described above to provide substantially non-linear and intermeshing edges 16 and 17 as shown. This results in an increased surface area of the edges 16 and 17 to which the sealing material can adhere as compared to the original strip 32 edges thereby improving the resultant strength of the seal. This also results in better hermeticity than prior cable core assemblies.

The deformed intermeshing edges 16 and 17 are the inherent result of the processing in accordance with the above described techniques and do not correspond to the shape of the original strip edges. The deformed edges 16 and 17 result from the drawing or sinking of the tube by the process of this invention.

In contrast, a tube formed by folding even with the use of a die forming technique would not have such deformed edges since in a folding operation the starting strip would not include the excess material which the process of this invention converts into longitudinal extension by drawing or sinking. A deficiency of the folding technique is that a well or depression occurs at the outer surface along the seam. In accordance with this invention the presence of excess material from the metal strip causes the outer surface to form against the die so as to eliminate such a well or depression along the seam. The sheath in accordance with this invention at the seam has a smooth and generally circular outer surface. This is highly significant since it reduces the amount of solder or brazing material which would be required to provide a circular outer periphery to the resultant sheath 14.

Since the strip 32 is being pulled through one or more dies a slightly harder material is desired in order to avoid strip breakage. Accordingly, the starting strip 32 should be work hardened to a hardness of at least about ¼ hard and preferably at least about full hard.

The strip 32 used to produce the sheath 14 may have any suitable configuration, for example, it could have a trapezoidal cross section.

Figure 5:
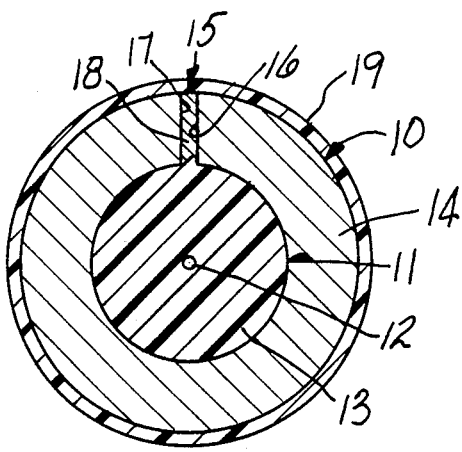

In accordance with this invention the diameter of the fiber optic core 11 for the embodiments other than that of FIG. 4 should not exceed the inside diameter of the sheath 14 by more than 10% and, preferably, not by more than 5%. With respect to the embodiment of FIG. 4, the mismatch may be such that the outside diameter of the core 11 exceeds the inside diameter of the sheath 14 by no more than 20% and, preferably, no more than 10%. If there is a slight excess of the diameter of the core versus the inside diameter of the sheath 14 in the embodiments of FIGS. 1, 2, 3 and 5, then there can be a slight extrusion of the layer 13 into the seam 15 in addition to the solder seal 18 as best illustrated in FIG. 5. This would provide a combined seal comprising the solder 18 and the extruded layer material 13. In any event for the embodiments of FIGS. 1 and 2 it is proposed that the outside diameter of the core 11 will be substantially equal to the inside diameter of the sheath 14.

While the sheath 14 has been described in a preferred embodiment as being formed of C.D.A. Copper Alloy 15100, it may be formed from any desired metal or alloy exhibiting the desired conductivity, strength and formability characteristics.

In accordance with this invention the optical fiber core 11 is preferably fed into the sheath without substantial back tension. This may be accomplished through the use of a slack loop and dancer arrangement or any other desired technique wherein the fiber merely travels along with the sheath 14 as the sheath is formed. A result of the processes in accordance with this invention is that the length of the optical fiber core 11 after fabrication exceeds the length of the sheath by less than about 1%. The fiber core 11 is, therefore, in slight compression rather than in tension which would deleteriously affect its transmission properties. Since the fiber is fed into the sheath during forming without substantial back tension removal of the drawing force for forming the sheath 14 causes the sheath material to elastically contract thereby providing the relative difference in length of the sheath 14 versus the length of the fiber core 11.

While the invention is particularly applicable to a range of metals and alloys it is preferably applied to high strength copper alloys. It has already been noted that it is desirable that the yield strain, which is the strain at the yield strength at 0.2% offset, should be less than about 1% and, preferably, as close as possible to 1%. Copper alloys because they have a lower modulus of elasticity can achieve this yield strain limitation without the necessity of going to extremely high strengths as, for example, might be required with stainless steel. This results in a unique combination of properties for the resultant sheath, namely it has very high strength but not so high as to prevent its being formed from a metal strip. Further, it has a high yield strain to prevent damage to the fiber in use.

Preferably, the alloy should have good resistance to softening upon short-term exposure to elevated temperatures so that it will not lose significant strength during the sealing operation. Suitable copper alloys in accordance with this invention having the requisite strength and softening resistance comprise alloys drawn from the following systems: copper-zirconium, copper-chromium, copper-iron, copper-silver, copper-magnesium-phosphorus, copper-nickel-silicon, etc. Generally, in such copper alloy systems copper is present in an amount of at least about 95% and represents the balance of the alloy. The alloying elements may be selected from the group consisting of zirconium, chromium, iron, magnesium, phosphorus, nickel, silicon, tin and silver as well as combinations thereof. For applications where a moderate strength level and a conductivity greater than about 50% IACS are needed, the alloying elements should preferably be present in an effective amount to provide the desired strength and softening resistance up to about 5% by weight of the alloy and most preferably in such an effective amount up to about 3% by weight of the alloy.

In addition to the previously described CDA Alloy 151 other suitable materials include CDA Alloys 155, 194 and 195. In addition, other high strength copper alloys such as CDA Alloys 638 and 654 can be used for very high strength applications. Alloy 638 includes aluminum, silicon and cobalt within the aforenoted range while Alloy 654 includes silicon, tin and chromium also within that range. In accordance with this invention the metal sheath or tube should preferably be formed from a material having a minimum of 45 ksi tensile strength at 400° F. in order to be properly processable in accordance with this invention which involves heating the sheath or tubing during soldering while it is maintained under high tension.

Futher, for certain applications where conductivity is not of significant importance the yield strength of the sheath should be at least about 100 ksi and most preferably at least about 150 ksi.

While the invention has been exemplified with respect to the use of a die for forming the U-shaped strip 32, if desired, roll forming could be employed to preform the preferred strip. The final forming of the strip strip into the circular sheath, however, should be by die forming as described.

While the mechanism for sealing the sheath 14 has been described in terms of a particular soldering operation and apparatus any suitable soldering, brazing or welding technique may be used.

While the communication cables described by reference to FIGS. 6, 7 and 8 have variously specified layers any desired layer arrangement as are known in the art could be employed.

The publications, papers and patents and patent applications set forth in this application are intended to be incorporated by reference herein.

It is apparent that there has been provided in accordance with this invention optical fiber communication cables and method and apparatus for assembling same which fully satisfy the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. An improved individually armored fiber optic core assembly having a diameter less than about 0.050" comprising:

a fiber optic element;

a protective layer surrounding said fiber optic element and forming in combination with said fiber optic element a fiber optic core; and a high strength drawn metal sheath surrounding said fiber optic core, said sheath including a generally longitudinally extending seam, with the ratio of the outside diameter of said fiber optic core to the inside diameter of said sheath comprising at least about 0.6:1, said seam being defined by opposing nonlinear deformed sheath edges each of whose length from the outside of said sheath to the inside of said sheath exceeds the thickness of said sheath.

2. An assembly as in claim 1 wherein the ratio of said fiber optic core outside diameter to said sheath inside diameter is at least 0.7:1.

3. An assembly as in claim 2 wherein said edges are intermeshing and said sheath has a yield strength of at least about 50 ksi.

4. An assembly as in claim 3 wherein said sheath closely surrounds said fiber optic core.

5. An assembly as in claim 4 wherein there is a generally intimate engagement between the outer surface of said fiber optic core and the inner surface of said metal sheath.

6. An assembly as in claim 1 wherein said sheath is formed of a copper alloy.

7. An assembly as in claim 6 wherein said copper alloy comprises a high strength copper alloy in at least about the full hard condition.

8. An assembly as in claim 7 wherein said sheath at said seam has a smooth and generally circular outer surface.

9. An assembly as in claim 1 wherein said seam is hermetally sealed.

10. An assembly as in claim 9 wherein said hermetic sealing comprises a solder seal.

11. An assembly as in claim 9 wherein said hermetic sealing comprises an extruded portion of said protective layer.

12. An assembly as in claim 1 further including an insulative coating about said sheath.

13. A communication cable including a plurality of said assemblies as in claims 1, 2, 3, 4, 5, 6, 9, 10, 11 or 12.

14. A communication cable including a plurality of said assemblies as in claim 1 supported within a tubular core.

15. A communication cable including a plurality of said assemblies as in claim 1 wrapped by a layer of tape to form a core.

16. A communication cable comprising a core composed of a plurality of strands of metal or plastic and wherein at least one assembly as in claim 1 is arranged within at least one internal interstice defined by said strands of said core.

17. A communication cable as in claim 16 including a plurality of said assemblies each in an interstice of said core strands.

18. A communication cable as in claims 14, 15, 16 or 17 further including an insulative layer, a loadbearing layer and an outer covering layer.

19. A communication cable comprising a core composed of a plurality of strands of metal or plastic and wherein at least one but less than all of said strands comprises an assembly as in claim 1.

20. A communication cable as in claim 19 including a plurality of said strands of metal or plastic and a plurality of said assemblies.

21. A process for forming an improved individually armored fiber optic core assembly having a diameter less than about 0.050" comprising:

providing a fiber optic core comprising a fiber optic element and a protective layer surrounding said fiber optic element;

providing a high strength metal strip having generally linear edges;

providing at least one die;

drawing said metal strip through said die while simultaneously inserting said fiber optic core so as to surround said core with said metal strip in a manner to provide a surrounding drawn metal sheath having a generally longitudinally extending seam, with the ratio of the outside diameter of said fiber optic core to the inside diameter of said drawn metal sheath comprising at least 0.6:1, said seam being defined by opposing nonlinear deformed strip edges each of whose length is greater than the starting thickness of said strip; and said metal strip being selected such that its transverse cross-sectional area exceeds the transverse cross-sectional area of said sheath by a desired amount to provide deformed edges after said drawing step.

22. A process as in claim 21 wherein said metal strip is drawn through said at least one die to closely surround said fiber optic core.

23. A process as in claim 21 wherein said metal strip is drawn through said at least one die to provide generally intimate engagement between the outer surface of said fiber optic core and the inner surface of said metal sheath.

24. A process as in claim 21 further including the step of sealing said seam.

25. A process as in claim 24 wherein said sealing step comprises soldering said seam.

26. A process as in claim 24 wherein said sealing step comprises extruding a portion of said protective layer of said fiber optic core into said seam.

27. A process as in claim 21 wherein said sheath is formed of a metal or alloy selected from the group consisting of copper, copper alloys, steel and stainless steels.

28. A process as in claim 21 further including the step of coating said metal sheath with an insulative layer.

29. A process as in claim 21 wherein said sheath edges are intermeshing and said sheath has a yield strength of at least about 50 ksi.

30. A process as in claims 21, 22, 23, 24, 25, 26, 27, 28, or 29 further including the step of forming a plurality of said assemblies into a communication cable.

31. A process as in claim 21 further including extruding a core of plastic material about a plurality of said assemblies and forming said core and assemblies into a communication cable.

32. A process as in claim 21 comprising wrapping a layer of tape about a plurality of said assemblies to form a core and forming said core and assemblies into a communication cable.

33. A process as in claim 21 comprising forming a communication cable comprising a core composed of a plurality of strands of metal or plastic and arranging at least one of said assemblies within at least one internal interstice defined by said strands of said core.

34. A process as in claim 33 wherein a plurality of said assemblies are arranged each in an interstice defined by said core strands.

* * * * *